H. E. IVES.
MEANS FOR PRODUCING FROM ARTIFICIAL LIGHTS THE COLOR EFFECT OF DAYLIGHT.
APPLICATION FILED FEB. 20, 1913.

1,104,900.    Patented July 28, 1914.

WITNESSES:
Rob't R Kitchel
Frank E French

INVENTOR
Herbert E. Ives
BY
Augustus B. Stoughton
ATTORNEY.

UNITED STATES PATENT OFFICE.

HERBERT E. IVES, OF MOUNT AIRY, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

MEANS FOR PRODUCING FROM ARTIFICIAL LIGHTS THE COLOR EFFECT OF DAYLIGHT.

1,104,900.           Specification of Letters Patent.      Patented July 28, 1914.

Application filed February 20, 1913. Serial No. 749,569.

*To all whom it may concern:*

Be it known that I, HERBERT E. IVES, a citizen of the United States, and a resident of Mount Airy, in the county of Philadelphia and State of Pennsylvania, have invented certain new and useful Means for Producing from Artificial Lights the Color Effect of Daylight, of which the following is a specification.

The principal object of the present invention is to provide means for producing from artificial lights the color effect of daylight which means can be conveniently used by those engaged in such occupations as dyeing, color printing, color work and surgical operations where it is important to know the relative color of tissues and many others which will occur to persons skilled in the art.

Generally stated the invention comprises goggles having a light excluding frame and provided with transparent glasses or other media of a color or colors adapted to copy the spectral composition of daylight, when used with an appropriate artificial light.

The invention will be claimed at the end hereof, but will be first described in connection with the accompanying drawings illustrating one, but by no means the only embodiment of the invention.

Figure 1:
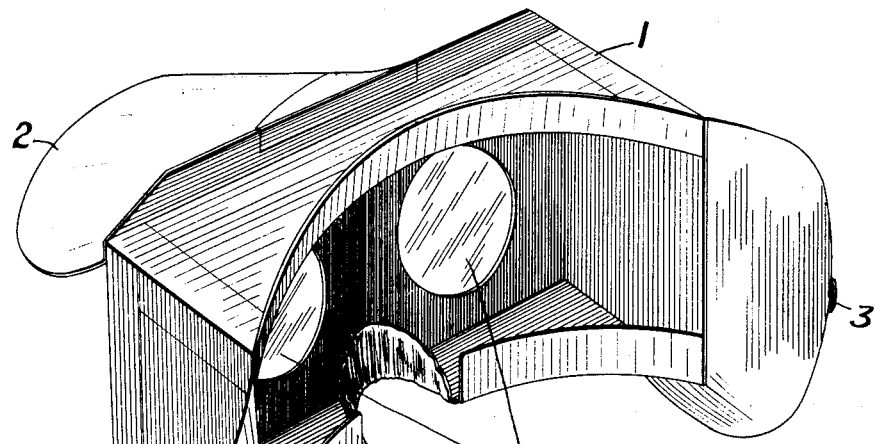
Figure 2:
Figure 3:
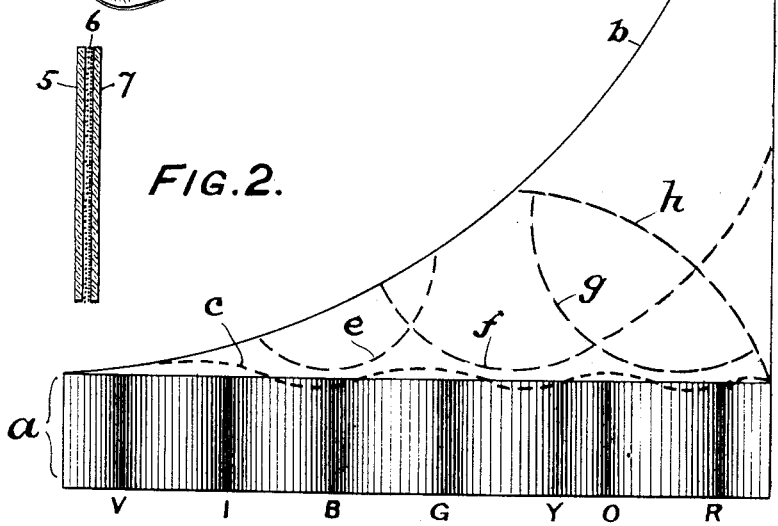

In the drawings, Figure 1 is a perspective view of a goggle embodying features of the invention. Fig. 2, is a transverse sectional view of the transparent glasses or other media forming part of the goggle, and Fig. 3 is a diagrammatic view illustrative of the principle upon which the glasses or media, shown in Fig. 2, are constructed.

In the drawings 1 is a goggle or instrument to be worn like spectacles and adapted by spreading at the base over the eyes to exclude light therefrom.

2, is a shield that may or may not be provided as desired.

3, are means for attaching the goggle to the head.

The details of construction are not important; the point is that in some way the frame of the instrument shall exclude, as nearly as practicable, all light from the eyes of the user, except such as comes through the color filter or absorbing screens hereinafter described, while at the same time the instrument can be conveniently and comfortably worn on the head so as to permit the wearer freedom of movement and an opportunity to obtain a satisfactory view of the work in hand.

4, are color filters or absorbing screens consisting of transparent glasses or other media of such color as to copy the spectral composition of daylight when the instrument is used with an appropriate artificial light.

Color filters or absorbing screens appropriate for use are described and claimed in an application filed by me on the 18th day of Feb., 1913, Serial Number 749,145. It is sufficient to say that the color filter or absorbing screens 4 consist of transparent media adapted to absorb color rays from a given artificial source and thus modify the light reaching the eyes, producing the effect of daylight. As an example, the element 5 of the color filter or absorbing screen may consist of signal green color, for example of glass of that color, and the element 6 may consist of gelatin, or the like, containing pigments or dies, preferably permanent in character, and of purple or pink color. The element 7 may consist of plain transparent glass and when present it serves as a protection for the element 6. The invention is, of course, not confined to the precise color filter or absorbing screen described.

The principle upon which the color filter or absorbing screen is constructed, designed or prepared may be described as follows:—Referring to the drawings and more particularly to Fig. 3, the rectangle $a$ diagrammatically represents the spectrum of daylight; the letters V, I, B, G, Y, O and R indicate the colors of that spectrum. The height of the rectangle represents the intensity of the various colors as present in the spectrum of daylight. The curved line $b$ indicates the relative intensity of the various colors in the spectrum of the artificial light which it is desired to modify.

For the sake of illustration and explanation the spectrum of the artificial light source and the spectrum of the daylight source are drawn as of equal intensities at the extreme violet end. Artificial light sources as generically represented by the area included under the curve $b$ are usually different from daylight in possessing an excess of the longer spectrum wave lengths, that is yellow, orange and red. An absorbing screen or color filter in order to alter an artificial light spectrum to that of daylight must absorb these excessive radiations. If the relative intensities of the different colors of the spectrum are plotted upon such a scale that the intensities of daylight and the artificial light sources are the same at the blue extremity of the spectrum, then the transmission of the absorbing screen must be as the reciprocal of the ratio at each color of the intensity of the artificial light spectrum to the daylight spectrum.

The color filter or absorbing screen is adapted by absorption to produce the above described result, or perhaps more accurately, a very close approximation to it. In Fig. 3, the approximation is indicated by the dotted line $c$, and the dotted lines $e$, $f$, $g$, and $h$, indicate the absorptions diagrammatically and separately. For example, the dotted line $h$ indicates that red rays are absorbed from the artificial light, reducing it from the curve $b$ to the line $h$. Similarly the dotted lines $e$, $f$, and $g$ represent other absorptions supplementary to the absorptions indicated by the line $h$. The dotted line $c$ indicates the net result of the various absorptions as has been stated.

In use the goggle having been fitted with color filters or absorbing screens appropriate for the artificial light, the user puts the goggles on and is then enabled to see objects, more especially, colors, as they appear in daylight and hence can successfully and conveniently carry on, by artificial illumination, many operations which at present can be carried on satisfactorily only by daylight and imperfectly by artificial light.

The means for excluding light prevent distortion of the color effect produced by the color filter or absorbing screen.

It will be obvious to those skilled in the art to which my invention relates that modifications may be made therein without departing from the spirit thereof, hence the invention is not limited to such matters nor do I intend to limit it by reason of any phraseology above used nor do I intend to limit it in any way further than the prior state of the art may require, but

Having thus described the nature and objects of my invention, what I claim as new and desire to secure by Letters Patent is,

1. An instrument for producing by artificial light the color effect of daylight which comprises the combination with a goggle provided with a frame adapted to exclude light, of a color filter or absorbing screen consisting of transparent media of appropriate color for copying the spectral composition of daylight when used with artificial light.

2. An instrument to be worn like spectacles and provided with means for excluding light and with transparent color filters or absorbing screens adapted to absorb color rays and modify light reaching the eyes from an artificial source to produce the effect of daylight.

In testimony whereof I have hereunto signed my name.

HERBERT E. IVES.

Witnesses:
CLIFFORD K. CASSEL,
FRANK E. FRENCH.